(12) United States Patent
Sandberg et al.

(10) Patent No.: US 10,387,130 B1
(45) Date of Patent: Aug. 20, 2019

(54) METADATA DRIVEN DISTRIBUTED APPLICATION BEHAVIOR SYSTEM AND METHOD

(75) Inventors: Andreas Sandberg, Cupertino, CA (US); Lila Alexei Tretikov, Los Gatos, CA (US); Majed Itani, San Jose, CA (US); Clint Oram, San Mateo, CA (US)

(73) Assignee: SUGARCRM INC., Cupertino, CA (US)

( * ) Notice: Subject to any disclaimer, the term of this patent is extended or adjusted under 35 U.S.C. 154(b) by 359 days.

(21) Appl. No.: 12/908,624

(22) Filed: Oct. 20, 2010

Related U.S. Application Data

(63) Continuation-in-part of application No. 12/062,511, filed on Apr. 4, 2008, now Pat. No. 9,268,538, and a continuation-in-part of application No. 12/072,362, filed on Feb. 25, 2008, now Pat. No. 8,839,232, said application No. 12/908,624 is a continuation-in-part of application No. 12/200,301, filed on Aug. 28, 2008, now abandoned, and a continuation-in-part of application No. 12/432,086, filed on Apr. 29, 2009, now abandoned.

(60) Provisional application No. 60/927,332, filed on May 2, 2007, provisional application No. 60/903,082, filed on Feb. 23, 2007.

(51) Int. Cl.
| | |
|---|---|
| *G06F 15/00* | (2006.01) |
| *G06F 8/61* | (2018.01) |
| *G06F 8/65* | (2018.01) |
| *G06F 17/00* | (2019.01) |

(52) U.S. Cl.
CPC ............... *G06F 8/61* (2013.01); *G06F 8/65* (2013.01); *G06F 17/00* (2013.01)

(58) Field of Classification Search
CPC ............... G06F 8/61; G06F 8/65; G06F 17/00
USPC ............................................. 717/114
See application file for complete search history.

(56) References Cited

U.S. PATENT DOCUMENTS

| | | | |
|---|---|---|---|
| 6,523,172 B1 * | 2/2003 | Martinez-Guerra et al. | 717/143 |
| 6,920,461 B2 * | 7/2005 | Hejlsberg et al. | 717/143 |
| 7,337,174 B1 * | 2/2008 | Craig | G06F 17/30914 |
| 7,480,665 B2 * | 1/2009 | Merchant et al. | 707/999.1 |
| 7,546,602 B2 * | 6/2009 | Hejlsberg et al. | 719/313 |
| 7,650,432 B2 * | 1/2010 | Bosworth et al. | 709/248 |
| 7,730,467 B1 * | 6/2010 | Hejlsberg et al. | 717/143 |
| 7,734,804 B2 * | 6/2010 | Lorenz | H04L 67/02 709/231 |
| 7,844,957 B2 * | 11/2010 | Doucette et al. | 717/140 |
| 7,877,420 B2 * | 1/2011 | Taylor et al. | 707/806 |
| 7,945,531 B2 * | 5/2011 | Mullender et al. | 707/625 |
| 8,244,051 B2 * | 8/2012 | Parsons et al. | 382/239 |
| 8,346,789 B2 * | 1/2013 | Klein, Jr. | 707/758 |
| 8,346,887 B1 * | 1/2013 | Kembel et al. | 709/217 |
| 8,495,510 B2 * | 7/2013 | Pradhan et al. | 715/764 |
| 8,499,028 B2 * | 7/2013 | Shu et al. | 709/202 |
| 2003/0093790 A1 * | 5/2003 | Logan et al. | 725/38 |
| 2005/0171956 A1 * | 8/2005 | O'Brien et al. | 707/10 |
| 2005/0193380 A1 * | 9/2005 | Vitanov et al. | 717/143 |
| 2007/0078885 A1 * | 4/2007 | Klein, Jr. | 707/102 |

(Continued)

*Primary Examiner* — Lewis A Bullock, Jr.
*Assistant Examiner* — Mohammad H Kabir
(74) *Attorney, Agent, or Firm* — Steven M. Greenberg, Esq.; Shutts & Bowen LLP

(57) ABSTRACT

A distributed metadata driven system and method that allows a single server component the ability to control the display, behavior, and functionality of client applications.

9 Claims, 14 Drawing Sheets

(56) References Cited

U.S. PATENT DOCUMENTS

| | | | |
|---|---|---|---|
| 2007/0220415 A1* | 9/2007 | Cheng | G06F 17/246 715/212 |
| 2009/0216815 A1* | 8/2009 | Braginsky | G06F 17/30176 |
| 2010/0070448 A1* | 3/2010 | Omoigui | H01L 27/1463 706/47 |

* cited by examiner

METADATA DRIVEN DISTRIBUTED APPLICATION BEHAVIOR SYSTEM AND METHOD

PRIORITY CLAIM/RELATED APPLICATIONS

This application claims priority to, under 35 USC 120 and is a continuation in part of co-pending U.S. patent application Ser. No. 12/062,511 filed on Apr. 4, 2008 and entitled "Metadata Driven User Interface System and Method" which in turn claims the benefit under 35 USC 119(e) to U.S. Provisional Patent Application Ser. No. 60/927,332 filed of May 2, 2007 and entitled "Metadata Driven User Interface System and Method", claims priority to, under 35 USC 120 and is a continuation in part of co-pending U.S. patent application Ser. No. 12/072,362 filed on Feb. 25, 2008 and entitled "CRM Portal System" which in turn claims the benefit under 35 USC 119(e) to U.S. Provisional Patent Application Ser. No. 60/903,082 filed on Feb. 23, 2007 and entitled "CRM Portal System", claims priority to, under 35 USC 120 and is a continuation in part of co-pending U.S. patent application Ser. No. 12/200,301 filed on Aug. 28, 2008 and entitled "CRM System And Method Having Drilldowns, ACLs, Shared Folders, A Tracker And A Module Builder" and co-pending U.S. patent application Ser. No. 12/432,086 filed on Apr. 29, 2009 and entitled "Business Software Application System and Method", the entirety of all of which are incorporated by reference herein.

FIELD

The disclosure relates generally to a software system and methodology that enables distributed client applications to derive functionality, standardized user interface components, and defined interactions from a metadata format provided by a server application.

BACKGROUND

The client-server model is a distributed application structure that has been prevalent in the computer software industry for decades. In essence it allows for distributed access to the same data by multiple clients. As this computing paradigm has continued to evolve it has become the staple of network computing as we know it today. Many of the business applications currently written are implementations of the client-server model over different protocols.

One of the most prevalent uses of the client-server model is for web-based applications. With web-based applications the client program is a software implementation known as a web browser that sends requests to a web server. In turn the web server communicates back to the client with responses that consist of data and presentation elements embedded within (X)HTML. The use of a markup language/protocol allows for great interoperability between different web browsers on multiple platforms.

The limitation however with web-based applications is that other distributed clients which do not implement the (X)HTML protocol or rich applications that utilize other technologies to render and execute programs can not consume, process, or interpret the information returned from a web server in an efficient and consistent manner. In response to this limitation web services were introduced.

Web services define an application-programming interface (API) that exposes and defines methods of communication between two machines. This allows client applications to access data in a machine-processable format from a server. The client can then determine how it should present the data received to the end user. Unfortunately web services that transmit data do not define the presentation format for how the data should be, among other things, displayed, formatted, connected, client-validated, cached. Additionally, the presentation capabilities of the client machine vary greatly in accordance to the hardware specifics, graphic capabilities, available software stack, etc. So even if an application provided a presentation format it is entirely possible that the end client may not be able to present or display the user interface in accordance with the specifications provided by the server. This content is statically embedded in the device and the User Interface as well as other auxiliary logic is separated from the server-defined behavior.

Thus, it is desirable to provide a new method for defining a metadata driven application behavior system that can be implemented across any type of client on any electrical device and it is to this end that the disclosure is directed.

BRIEF DESCRIPTION OF THE DRAWINGS

Figure 9:
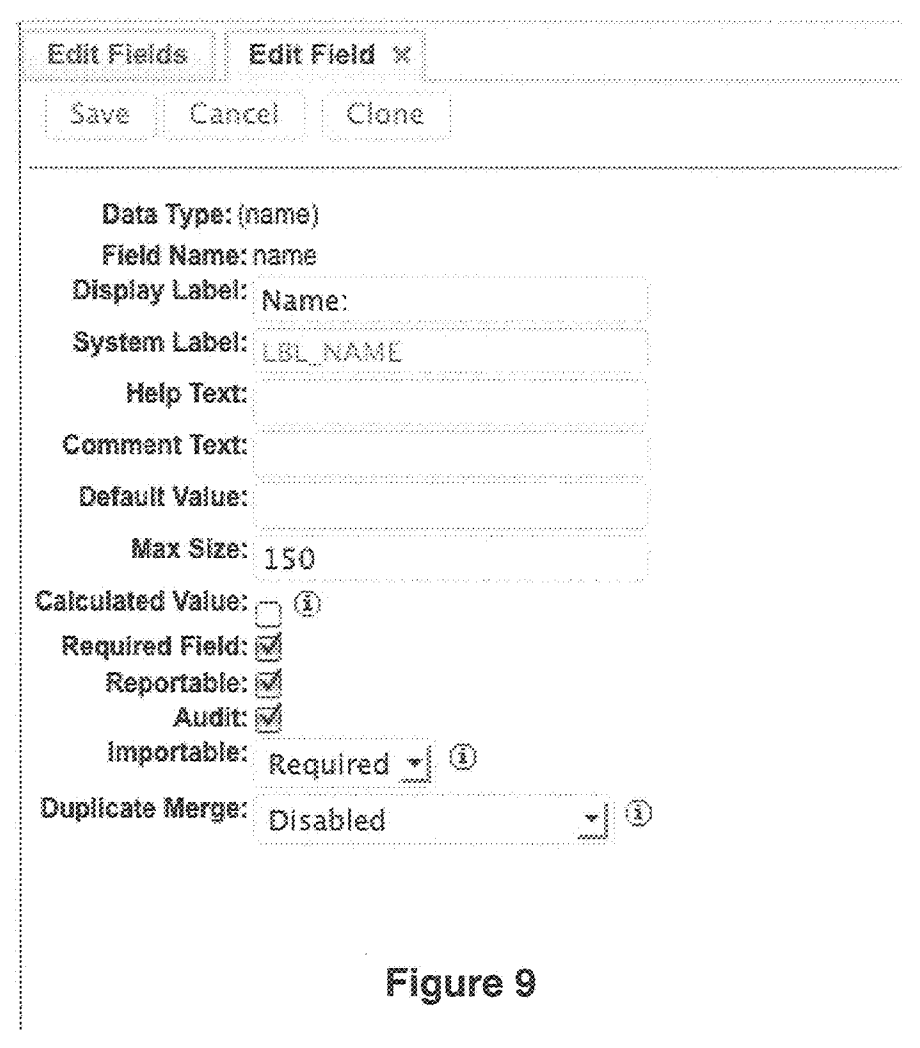
Figure 10:
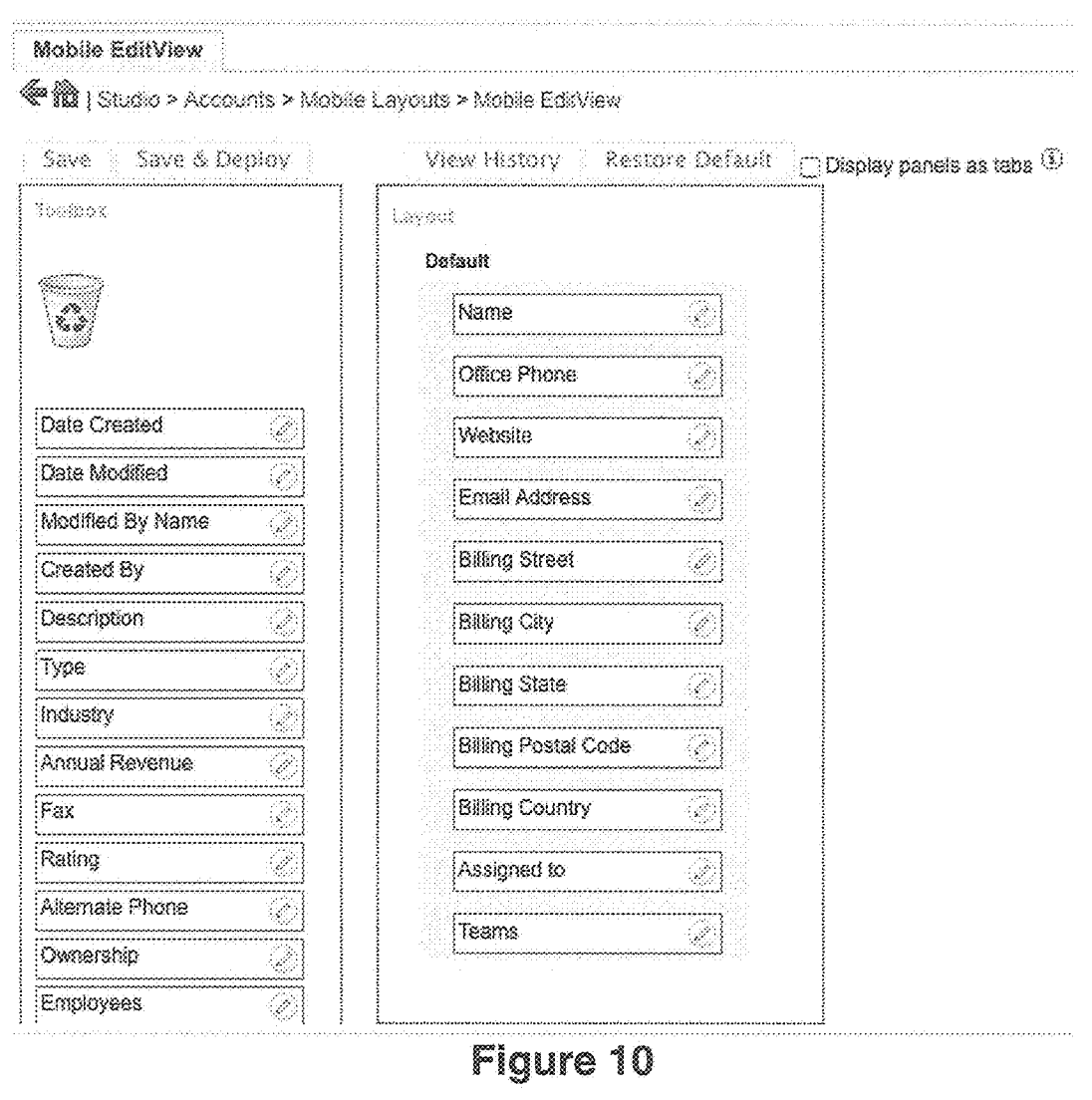
Figure 11:
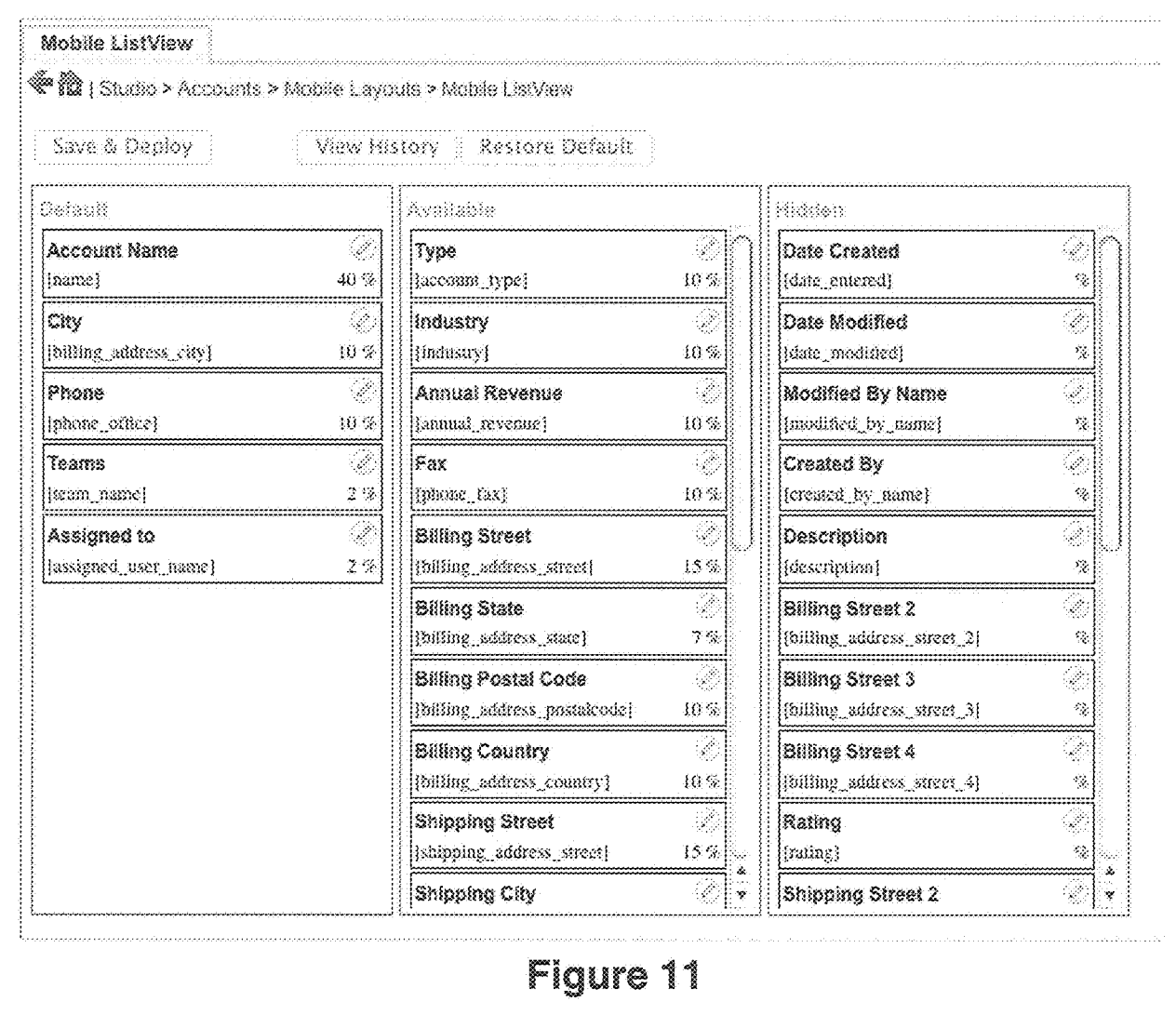

FIGS. 9-13 illustrate configuration interfaces for target client applications.

DETAILED DESCRIPTION OF ONE OR MORE EMBODIMENTS

The system and method are applicable to any client-server architecture that needs to provide distributed clients with the ability to render user interface components and manage interactions as defined and provided by a server application. It is in this context that the invention will be described. It will be appreciated, however, that the methods, algorithms, and implementation in accordance with the invention has greater utility, such as the ability to be utilized in different architectural designs including but not limited to embedded systems, stand-alone applications, peer-to-peer architectures, etc. For purposes of illustration, the described system is an implementation in a customer relationship management (CRM) system and on a mobile phone client. In the example, the CRM system is SugarCRM Inc.'s Enterprise Edition 6.1 and the mobile client is an iPhone 4 device running iOS 4.1 sold by Apple Inc. Example systems are used for illustration purposes only and do not pre-suppose any specific functionalities. As used herein, the SugarCRM system may also be referred to as the server whereas the mobile phone device may also be refereed to as the client.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
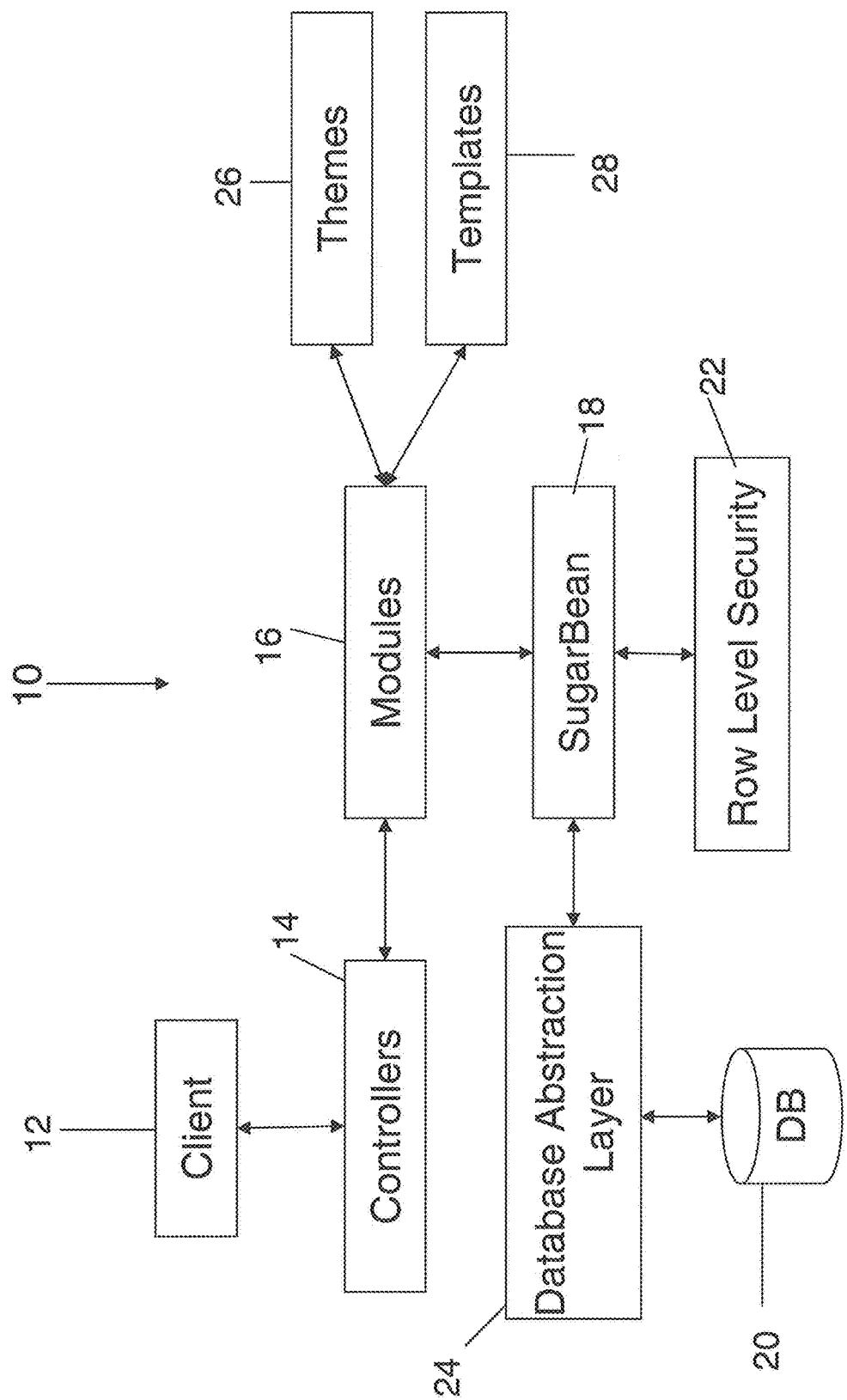
FIG. 1A is a diagram illustrating an implementation of a business software application system, implementing a customer relationship management system, that incorporates various features.
Figure 1B:
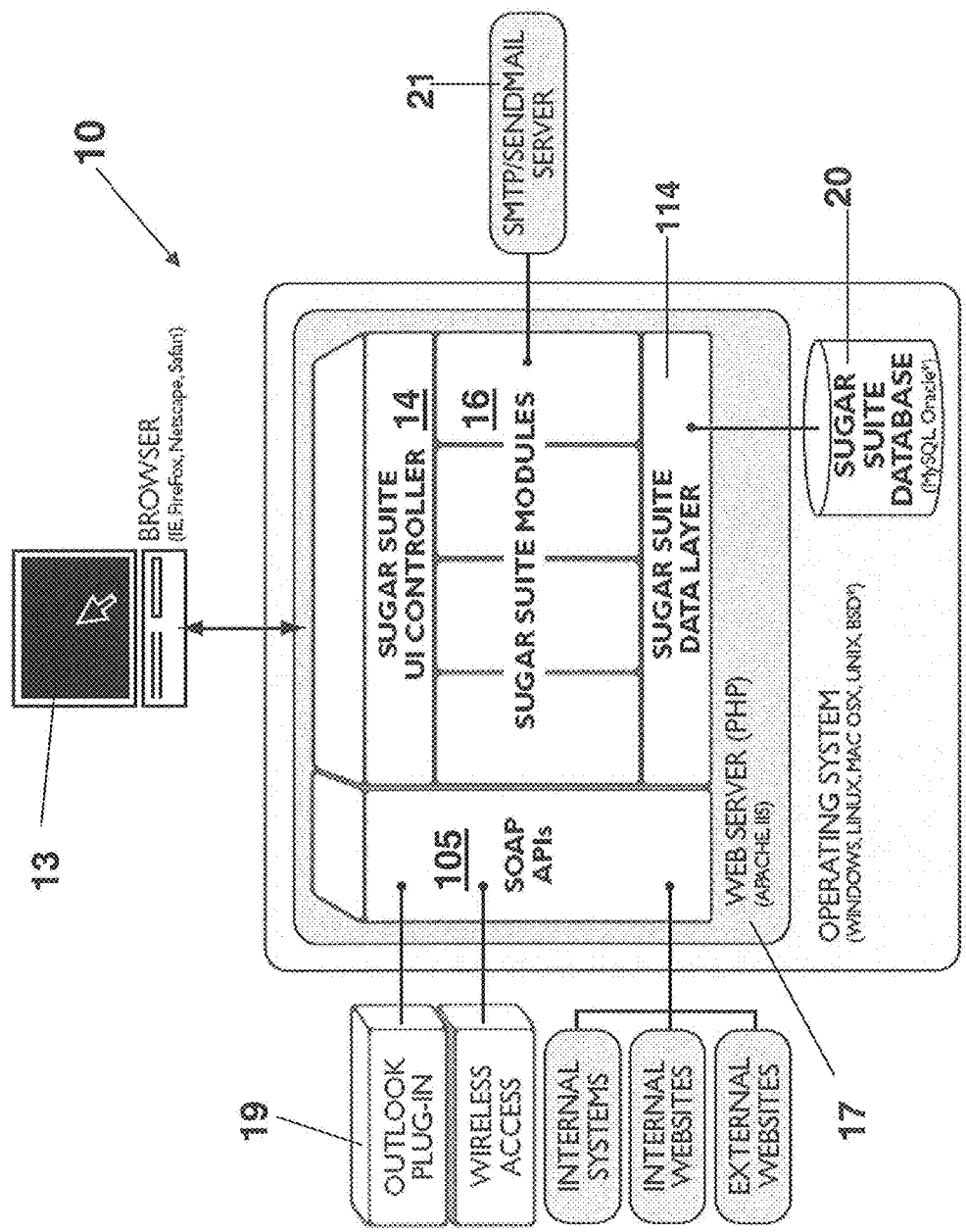
FIG. 1B illustrates more details of the business software application system that incorporates various features.

FIG. 1A is a diagram illustrating a customer relationship management (CRM) system 10 that is an example of a software-based business software application. In one embodiment, the system 10 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 20 that stores the data associated with the system 10. The system may have one or more clients 12, such as a browser application executed on a typical computing device (a browser client session), that accesses the system over a communications network 13 such as the Internet, a cellular network, a wireless network and the like. The computing devices may include a laptop, table or desktop computer system, a PDA, a mobile phone, a portable wireless email device and the like. The client's 12 interactions with the system are managed and go through a set of one or more controllers 14. The controllers 14 are the entry-point into the system for an entity that is using the system wherein the entity may be a person who accesses the system, such as by using a browser application, a computing device or a software program that uses this entry point. The controllers 14 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 16 that are components of application functionality and provide certain functionality to the entity accessing the system. The modules 16 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 18 and each module references the SugarBean to retrieve the data from the database 20 required for display and uses certain functions and operations instantiated in the SugarBean base object.

Figure 2:
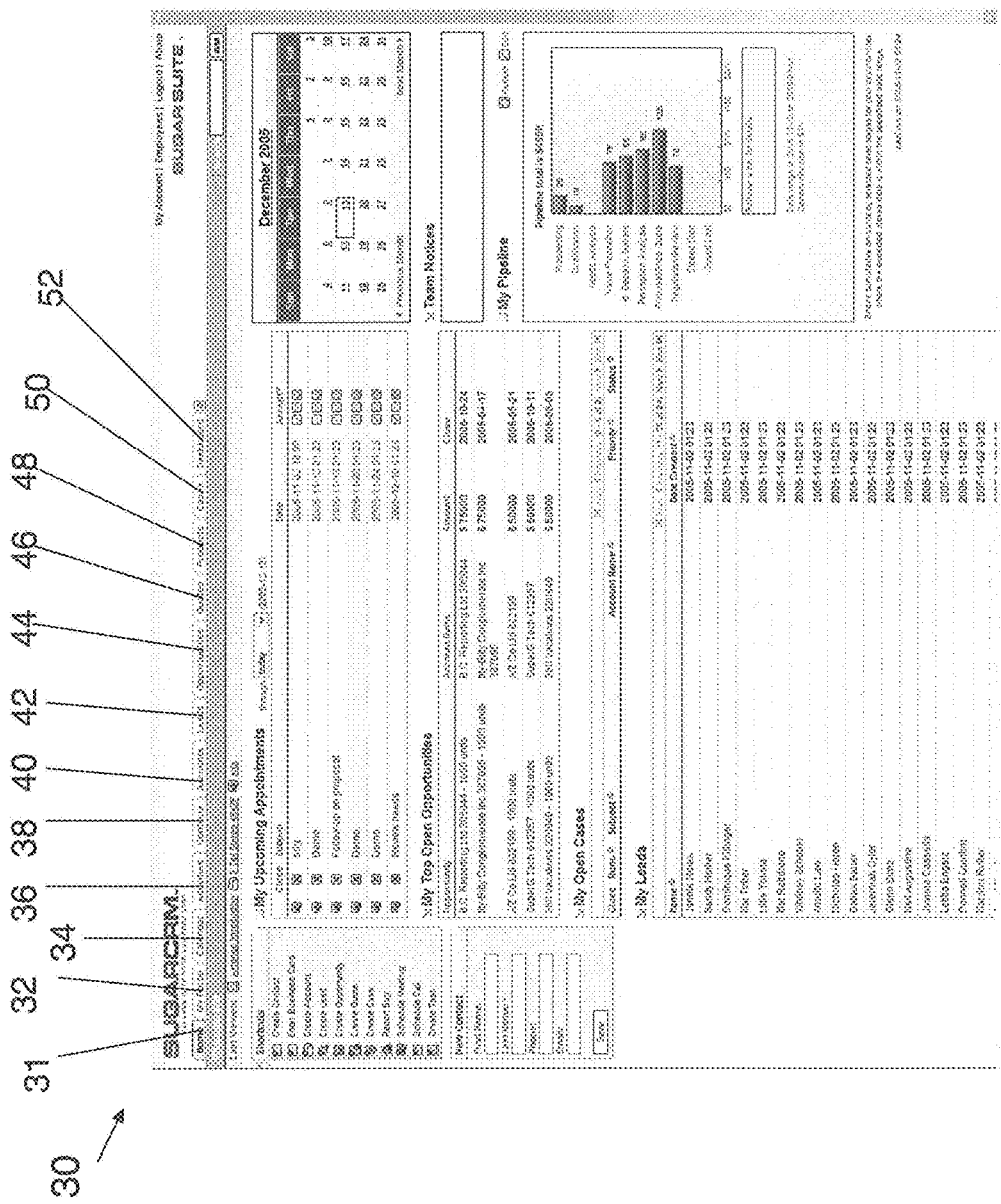
FIG. 2 is a diagram illustrating an example of the user interface of the system in FIGS. 1A and 1B.

FIG. 2 is a diagram illustrating an example of the user interface 30 of the system in FIGS. 1A and 1B. The user interface may include a home tab 31 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 32), contains a series of shortcuts which can link to any web site chosen by the user that may include e-mail, forums, or any other web-based application, allowing the system to become a single user interface for multiple applications. The calendar module may be selected by a calendar tab 34 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 36 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 38 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 40 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 42 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 44 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 46 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 48 and permits the user to view a paginated list of products, or search for a specific product. The user can click on an individual product to zoom in on the detailed product information. A product is used when assembling a customer quote. The cases module may be accessed using a cases tab 50 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard module may be accessed using a dashboard tab 52 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 20 that contains the data of the system and a security module 22 (row level security) that implements the security methods to control access to the data in the database 20 since the database is shared by all users of the system and the data must be segregated based on the users and their access level to different pieces of data. The system may also include a database abstraction layer 24 that is coupled between the database 20 and the SugarBean object 18 and acts as an interface between the database 20 and the SugarBean object 18. The SugarBean object 18 provides the base logic required for retrieving, making available and writing information to/from the database and each module creates subclasses of SugarBean (an example of which was described above) to provide module specific details, module specific data and module specific data views. During the process of retrieving data from the database, the SugarBean 18 makes calls that populate the row level security information into the SQL engine/database management system that retrieves the data.

Once the data is retrieved from the database by the SugarBean object 18, the module uses a template mechanism 28 and a theme 26 to produce the requested presentation (user interface) for the user. The template mechanism reformats the data from the database 20 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 22. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 28 and the code for the current user's theme (retrieved by the theme module 26) is used to create the user interface for the presentation of the particular Contact data to the particular user. The resulting user interface then is sent back to the computing device with of client that requested it.

FIG. 1B illustrates more details of the customer relationship management system 10. Like elements shown in FIGS. 1A and 1B have like reference numerals. The system may interface with a typical browser application 103 (being executed by a computing device) that can access the system 10 over the web. For example, the examples of the user interface below are web-based views generated by the system and displayed on a browser application. The system may further comprise an application programming interface (APIs) portion 15, that may preferably use the well known simple object access protocol (SOAP), to interface with other existing system and applications. For example, the APIs may be used to interface to an email plug-in 19, such as an SugarCRM Plug-In for Microsoft Outlook®, that enhances the email program to allow it to interact with the system 10. As shown, the system 10, in one implementation, is implemented on a web server application 17 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 10 may also have an email module 21 capable of sending email via a local program (that may preferably be sendmail) or an email server leveraging the SMTP protocol. Now, a distributed metadata driven system is described in more detail.

A distributed metadata driven software system is presented that provides the ability to deploy multiple clients that can access and display data, UI elements, and views from a centralized server with guaranteed consistency and a standardized user interface paradigm. This alleviates the need for each client implementation to create a static user interface that may change over time and need constant updating. The system and method allows for administrators of the server system to easily modify and deploy changes to the metadata. Furthermore, clients are capable of rendering the modified metadata at run-time without the need for any configuration changes meaning that the user interface can be rendered in real time. In addition to the display components that are presented to the end user on the client side, certain attributes can also be represented within the metadata that drives and influences the behavior of the system.

The SugarCRM Enterprise Edition system (shown in FIGS. 1A, 1B and 2 above and described above) is a web-based application that is typically accessed from a web browser. Since this program contains critical data to its users, it is imperative that they have quick access to the system and their data. This is not an issue if the user has access to an electronic device that can run a modern web browser. However, in the event that the user only has access to a device with limited computing power or the form-factor of the end device presents certain constraints on the usage of a web browser, they may not be able to access the SugarCRM system. Alternatively, it is also feasible that distributed clients may wish to access the SugarCRM system without having to utilize a web browser as a software system. Web browsers are typically large software applications with varying speeds of performance depending on the implementation. In many cases it is more desirable for the client application to be able to process and display metadata received from the server using native graphical components.

In today's market place, many device manufacturers offer development kits (also known as SDK) that can be used for development and production of an application that can be loaded and run by an end user. This is the case with the iOS SDK that is provided for a limited fee and allows developers the opportunity to create and distribute applications that run on the iOS mobile platform. The iOS platform is the software stack that is available on the client device referenced throughout this example and includes the core operating system components as well as the APIs for building target device applications. Typically the user interface elements would be designed, defined, and incorporated into an application prior to its availability for end user consumption. The applications are considered designed in such a manner that the UI layer and application flow are static. A common issue with this implementation is that the UI layer or logic cannot easily be modified in a time efficient manner. Nor can it be specified by an administrator and propagated to all typed of target, heterogeneous systems. In order to accommodate changes the developer of the application would need to update the actually binary, which could take a substantial amount of time and the user must then re-load the new binary onto the target system.

The system and method provides any distributed client with the ability to process metadata, specify application behavior and display the corresponding user interface components associated with the graphical capabilities of the device in accordance to what is defined within the metadata in real time. This means that administrators of the server system can frequently update the available metadata with the expectation that no other changes are required to any of the distributed clients in order to render the updated user interface. The system and method is also capable of determining the interactions available to end users of the device within the user interface generated from the metadata. Due to the nature of client-server architecture, the system and method may be thus implemented and deployed on numerous, heterogeneous systems and the system and method can be deployed and incorporated on any device with a graphical user interface for a display screen or portion thereof.

Typically a distributed client will request a copy of the metadata that is available from the server before it can start processing the metadata. However, in many cases it is also possible that the client system actually stores a copy of the metadata so that in the event that a communication channel cannot be established to the server, the client may still function at an operational level. To reduce network overhead the client may initiate a dialogue with the server to determine if the metadata file has been modified since the last time the client received a copy, if applicable. In the event that modifications to the metadata have been detected, the client is provided with an updated copy. In certain situations it may be necessary for the server application to first verify the credentials of the requesting client before passing on the metadata. The details of the management and creation of the metadata for the UI is described in more detail in co-pending U.S. patent application Ser. No. 12/062,511 filed on Apr. 4, 2008 and entitled "Metadata Driven User Interface System and Method" which is incorporated herein by reference.

The server CRM application may provide facilities for creation and management of the metadata described herein. A user interface may present layouts, rules, components of various types, uploadable or modifiable UI components, visibility settings, and other configurations for setup and modification. Changes to this data and deployment parameters will have immediate affect on the User Experience and client application behavior.

The creation and management of metadata is centralized in the SugarCRM Studio & Module Builder components (described in more detail in co-pending U.S. patent application Ser. No. 12/200,301 filed on Aug. 28, 2008 and entitled "CRM SYSTEM AND METHOD HAVING DRILLDOWNS, ACLs, SHARED FOLDERS, A TRACKER AND A MODULE BUILDER" and co-pending U.S. patent application Ser. No. 12/432,086 filed on Apr. 29, 2009 and entitled "Business Software Application System and Method", the entirety of both of which are incorporated herein by reference) and can be accessed and controlled visually by the application administrator. FIGS. 9-13 below show examples of such a visual configuration module. Multiple end targets can be specified, or a default behavior may be provided.

Figure 3:
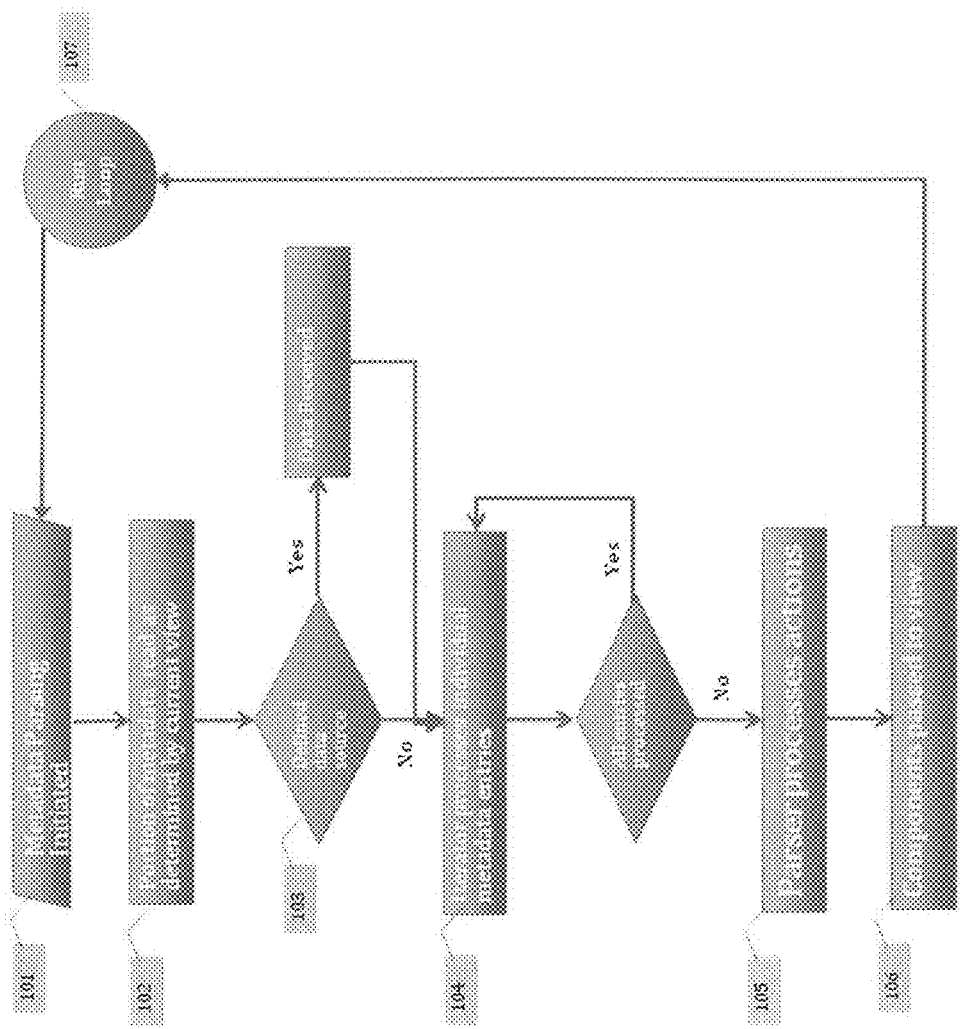
FIG. 3 is a diagram illustrating an iterative method for parsing and processing metadata.

Turning now to an embodiment of the system, once the client obtains the necessary metadata, a process is initiated that dissects, parses, interprets, and renders instructions for application behavior and the user interface (UI) based on the metadata. FIG. 3 is a diagram illustrating a method for iterative processing of the metadata. In step 101 the client 12 initiates the initial process as previously described. This step may be trigged once the client application has completed its start up cycle or it may be initiated from a trapped event that is caught by the system indicating the end user performed a certain action.

The functions and methods responsible for the processing of the metadata are managed by the controller 14. In the context of the current example, the client system has been notified that it should display a list of Contact objects that reside in the SugarCRM system. The controller 14 then examines the metadata to seek out the defined portion that represents the list view as illustrated in step 102. The metadata is structured in such a manner that the parser can determine how much of the metadata should be read at every given stage of the application lifecycle. The metadata that the controller 14 will operate on for this example may be defined as follows:
data_source=>'server',
layout=>'vertical',
actions=>array('search','detail'),
fields=>array(
  'name'=>array(
    'width'=>'20%',
    'label'=>'LBL_LIST_NAME',
    'link'=>true,
    'orderBy'=>'name',
    'default'=>true,
    ),
  'title'=>array(
    'width'=>'15%',
    'label'=>'LBL_LIST_TITLE',
    'default'=>true),
)

Returning to FIG. 3, in step 103, the system determines from the metadata whether an optional data source has been defined since the system and method are capable of incorporating data elements retrieved from remote data stores or local data stores during the processing phase. If data is required from an optional data source, that data is retrieved. Once the data objects have been returned from the server application, an iterative process is then initiated in step 104, which iterates over each individual field entry defined in the field definition section of the metadata. During this iterative process, the controller 14 process chunks of metadata. For each chunk of data a corresponding UI element is created. After each pass the iterator determines if an end condition has been met which implies that all of the field metadata has been processed.

Figure 5:
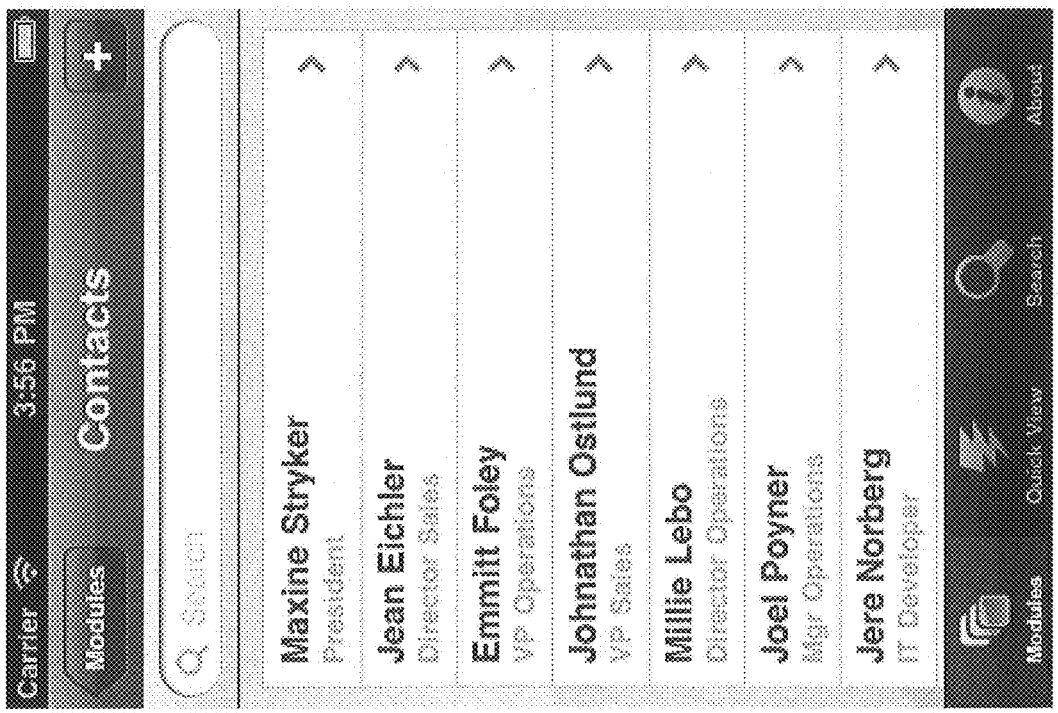
FIGS. 5-7 illustrate examples of user interfaces that are rendered from a metadata format.

In step 105 the parser then continues and begins constructing any UI elements that corresponds to available actions or interactions as defined in the metadata. For example, in reference to the metadata mentioned above, two actions are defined: a search action and a detail action. UI elements are then constructed and associated with these actions. Step 107 indicates that when the system is in the run loop, a user may interact with these action UI elements that may eventually cause a new view to be rendered and the process repeats itself. To complete this example, once step 105 has been completed, the UI elements that have been created are then passed to the view component of the application that performs the actual rendering onto the device screen. FIG. 5 shows the view that is rendered to the end user in accordance with the current example.

Figure 6:
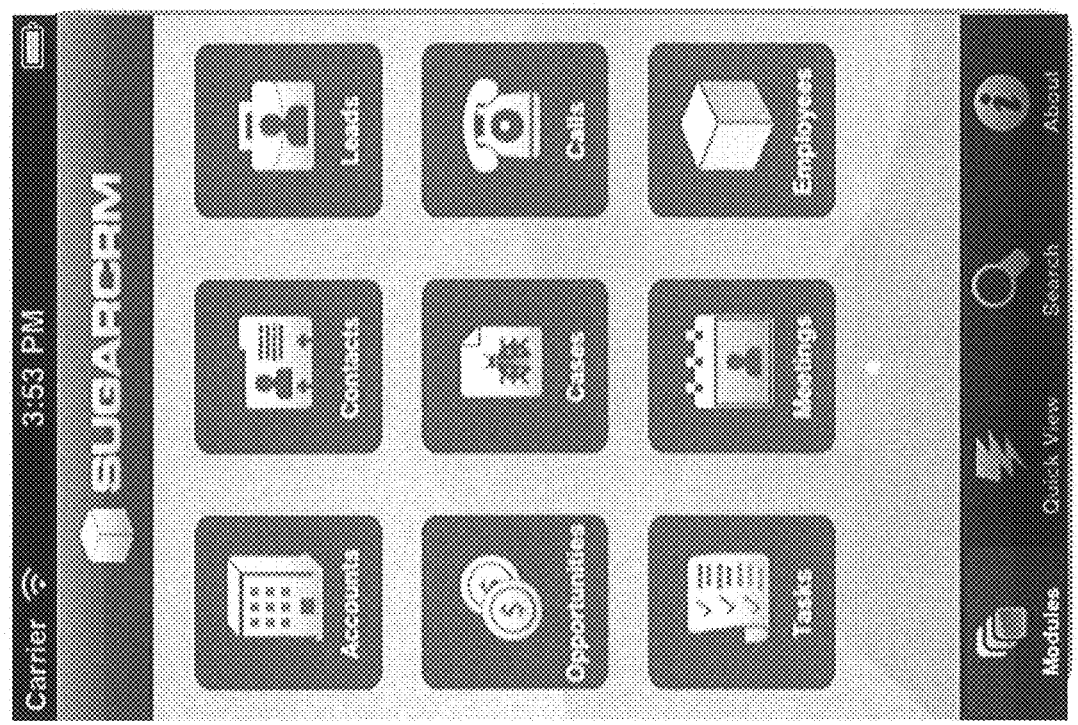

It is to be appreciated that an inexhaustible combination of UI elements may be defined within the metadata. This allows the flexibility of presenting different types of views to the end user that may vary in complexity and or simplicity. For example, FIG. 6 illustrates a dashboard type view in which a list of available objects from the SugarCRM system is displayed on the client device. Another illustration of this example is evident in FIG. 7 where the client device is displaying a specific account record from the server. The user may actually edit and save the record that is then transmitted back to the server. Thus it is possible to define complex interactions for different views that result in the execution of specific actions on the client side. Behavior and flow applications behave in a similar fashion to those of the UI metadata specification.

Figure 4:
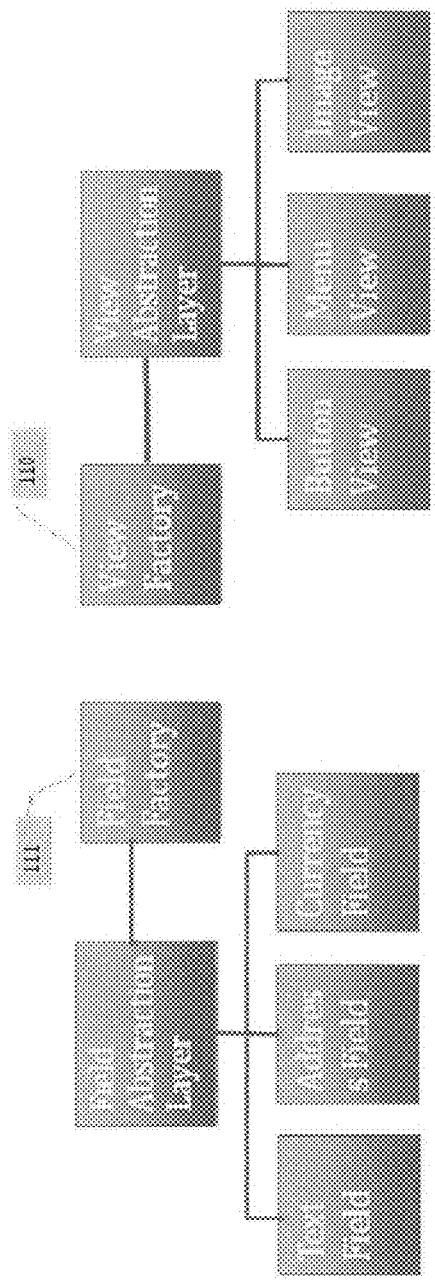
FIG. 4 is a diagram illustrating exemplary methods and functions responsible for the generation of the user interface.

In one embodiment of the system and method, the system uses a combination of several concrete base classes to instantiate UI elements that may include fields, menus, buttons, views, but not limited to the previous items mentioned in accordance with the capabilities and limitations of the client device as defined in the metadata. FIG. 4 illustrates the components that are responsible for processing and creating the UI elements as previously mentioned in step 106. The view factory component 110 is responsible for creating views that are portions of the screen that are eventually rendered. Views may be composed of other sub views, view UI elements, or field UI elements generated by the field factory 111. The concept of views that are rendered on a display screen should not be confused with the nomenclature used to describe the view component for a MVC architectural pattern.

Further, standard visibility and access rules can be applied dynamically via the use of the expression engine by altering metadata on the server side of the application. The client application then, may not require extensive access control rules to be implemented and derived all of the rules from the metadata obtained from the central server.

The second component that may be utilized is the field factory class 111. The field factory classes implements the same principles as the view factory class so that it can create specific UI fields. However, the field factory class generally renders UI components that can accept input and or interactions provided from the end user. Field UI elements also have many different configurable properties that can be defined within the metadata and processed by the parser. For example, consider the following metadata entry:

'status'=>
  array (
    'name'=>'status',
    'vname'=>'LBL_STATUS',
    'type'=>'enum',
    'options'=>'case_status_dom',
    'len'=>100,
    'audited'=>true,
    'required'=>true,
    'deaulf=>'Held',
  )

Figure 8:
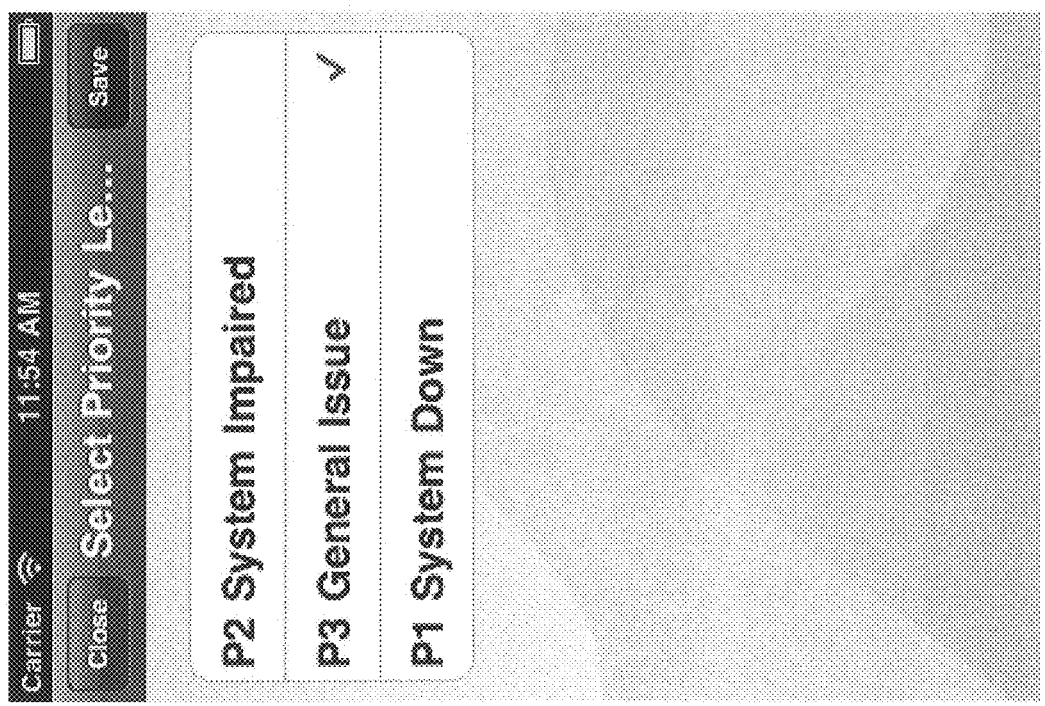
FIG. 8 is a diagram illustrating an enumerated UI field type generated by the system.
Figure 12:
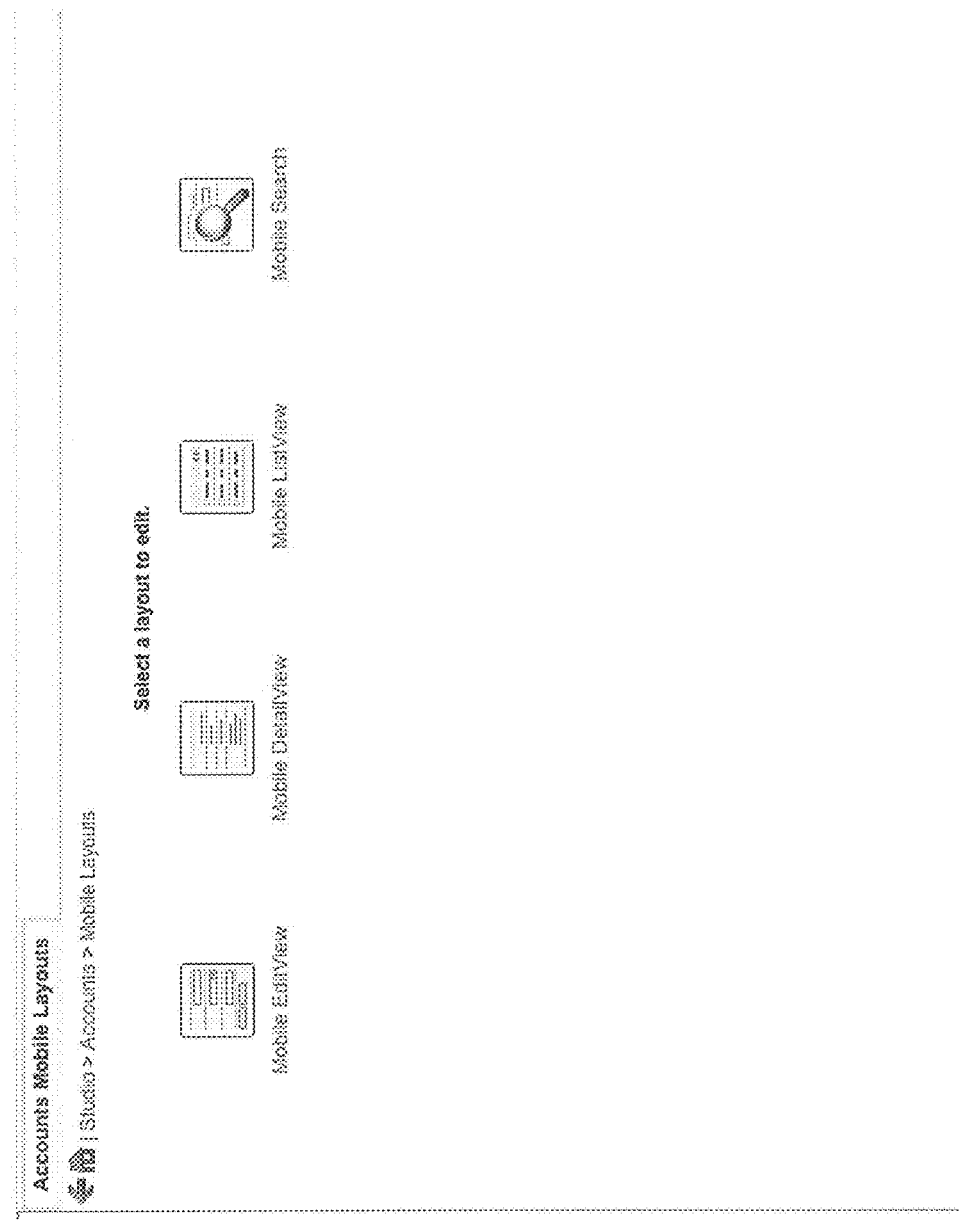
Figure 13:
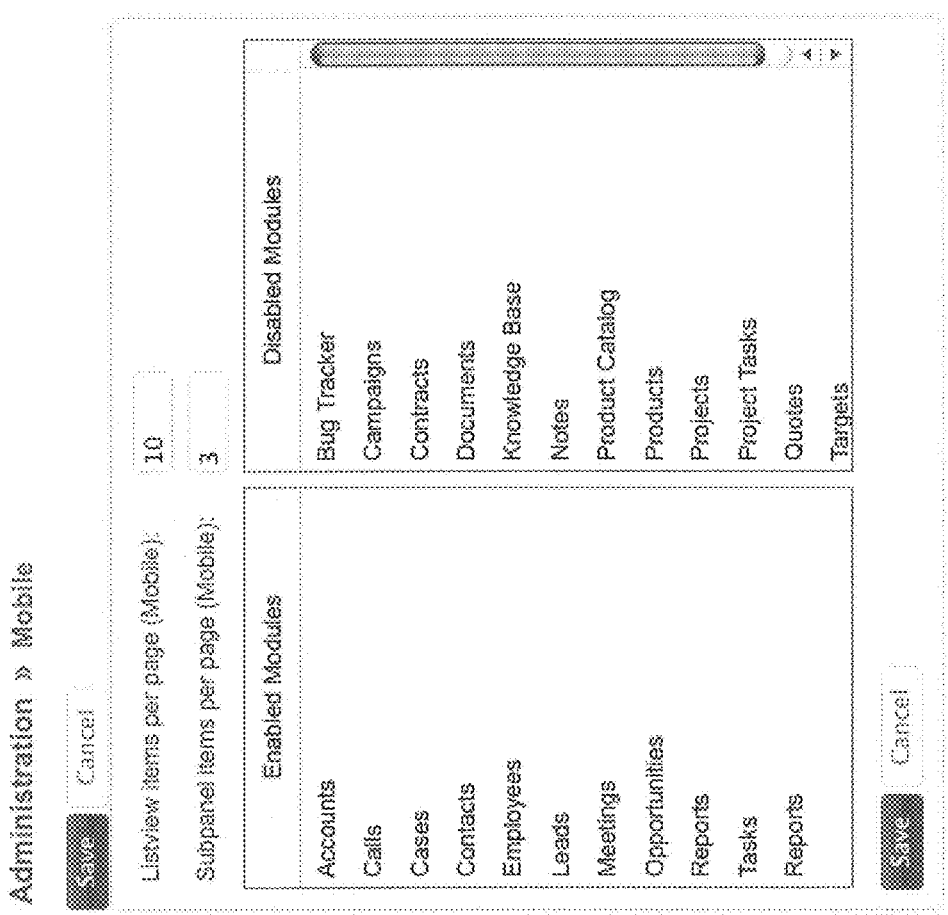

The presence of the required key indicates that when a user attempts to interact with the UI element they will be required to enter a value before they can proceed with certain actions that are related to the current view. Also of significant importance is the type attribute. When the field factory processes this metadata portion it will create a corresponding UI element that is of an enumeration type. Enumeration type fields allow users to select from a list of available options as illustrated in FIG. 8.

Figure 7:
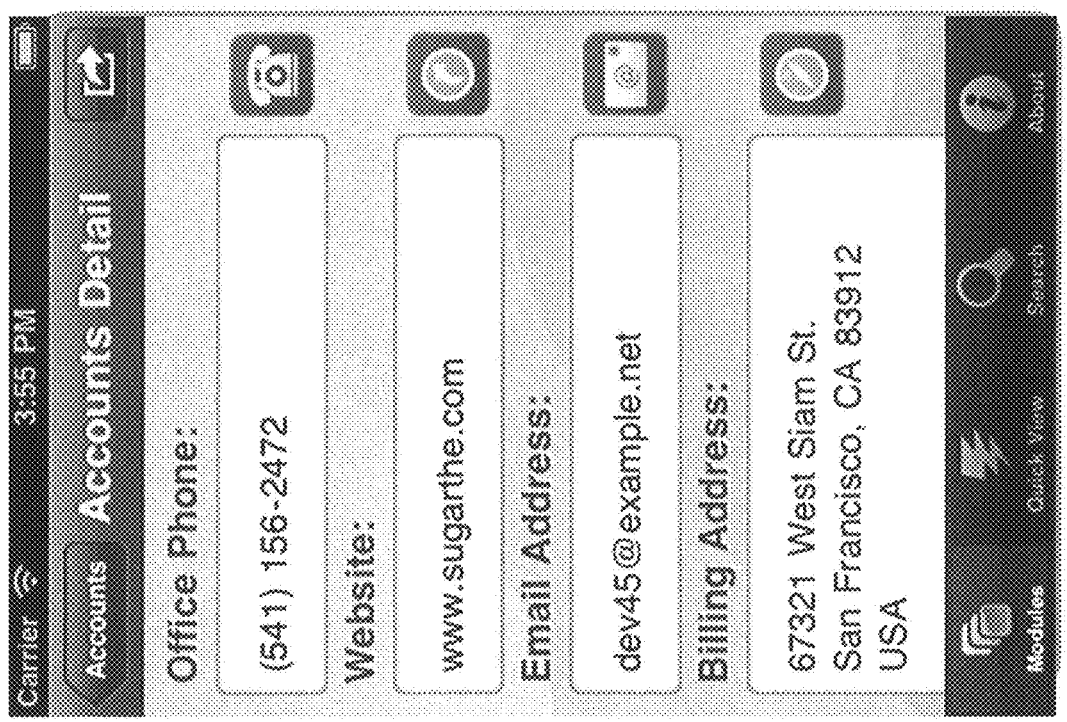

In addition to the requirement and type indicators previously described, the metadata may also contain additional rules describing the layout, visibility, Look & Feel, and navigation flow of the application. For example, consider the following metadata entry:

'templateMeta'=>array(
  'form'=>array('buttons'=>array('SAVE', 'CANCEL')),
  'maxColumns'=>'1',
  'useTabs'=>false,
  'widths'=>array(
    array('label'=>'80', 'field'=>'80'),
  ), In one embodiment of the system, while constructing the UI layout for an Account edit screen the client examines the maxColumns, useTabs, and widths properties. From this information the client determines that only a single column layout should be rendered and the widths of the label and fields should be set to 80% of the screen width. Also, since the useTabs property has been set to false the system will not display a tabbed view paradigm. The resulting screen is depicted in FIG. 7. Present in the metadata is also the form entry that for this particular view determines the available navigation items. For this example the user may perform two actions: either save or cancel.

Rules for visibility are also provided within the metadata and may be applicable to several different types of UI elements including but not limited to: fields, screens, and actions. This allows administrators of the system to configure these rules in a central location and ensures consistent constraints and that access controls are enforced. The visibility of a particular UI element also affects the navigation flow of the system. Consider the following metadata example:

[module_key]=>Contacts
  [visibility]=>Array
  (
    [0]=>Array ([view]=>edit [access]=>false)
    [1]=>Array ([view]=>detail [access]=>true)
    [2]=>Array ([view]=>list [access]=>true)
  )

This information specifies for the contacts module which views a user may access and those that are prohibited. Thus, when a user attempts to access a Contact record the system will determine the visibility of the detail screen by examining the metadata previously described. In this example the user has access so the request is granted by the system. However, if the user attempts to edit the record, the request is denied and an appropriate error message displayed to the user.

Another rule that may be specified within the metadata is the Look & Feel that the client should adhere to when rendering the graphic user interface and is also referred to as a theme. The metadata describes not only what the current preferred theme of the user is but also the set of available themes that the user may select from. The user may select from the list of available themes at runtime and the client application is responsible for adhering to the design principles specified by the theme. The following metadata is a typical example for how the themes or available Look & Feel may be specified:

[user_preferences]=>Array
(
  [user_theme]=>Array (
  [name]=>user_theme, [value]=>sunset
  )
  [avail_themes]=>Array(
    [name]=>avail_themes,
    [value]=>Array (
      [0]=>Amore,[1]=>Green, [2]=>Paradise,[3]
        =>Sugar, [4]=>Sunset,
    )
)

Embodiments of the system and method further include the ability for end users to modify and rearrange field level UI elements in a fashion similar to that applied to all UI elements described in this embodiment. FIGS. 9-13 illustrate configuration interfaces for target client applications.

Thus, a method and implementation of a metadata driven UI that can be distributed from a single server application across multiple clients has been described. While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method for providing a distributed metadata user interface from a centralized server to a plurality of target heterogeneous native clients wherein the centralized server has a database containing metadata and a security module that implements security methods to control access to the metadata and is interfaced with a master interface object that provides logic required for retrieving and writing information to the database, the method comprising:

simultaneously performing for two or more heterogeneous native clients the steps of:

creating a custom interface object from the master interface object, wherein the custom interface object customizes access and presentation of a user interface based on security privileges of the respective heterogeneous native client and each heterogeneous native client has different privileges;

verifying security privileges of the client by the custom interface object and determining an accessible set of metadata accessible to the respective native client from the centralized server through a database abstraction layer that is in communication with the custom interface object, based on the security privileges of the client;

retrieving, by the centralized server, the accessible set of metadata for the respective native client from the database;

determining, by the centralized server, if links to optional data sources is in the accessible set of metadata by performing the steps of:

parsing the accessible set of metadata to identify field entries to optional data sources defined in the metadata; and iteratively processing each field entry by retrieving the data for updating the accessible set of metadata;

generating a plurality of user interface elements, by the custom interface object for the respective native client based on the updated accessible set of metadata;

generating an action user interface element for the client based on the updated accessible set of metadata, the action user interface element corresponding to an available action defined in the updated accessible set of metadata; and rendering the user interface for the client using the plurality of user interface elements and the action user interface element, wherein the user interface for the client is dynamically rendered based on the updated accessible set of metadata.

2. The method of claim 1, wherein the client is a software application running on a computing device.

3. The method of claim 1 further comprising managing the set of metadata at a remote data source.

4. The method of claim 1 further comprising providing, by a remote data source, different copies of the set of metadata to a plurality of heterogeneous devices wherein the client of each heterogeneous device renders the user interface based on the set of metadata.

5. The method of claim 1, wherein parsing updated copy of the set of the set of metadata further comprises determining, by the client, if data from a remote data source is part of the updated copy of the set of set of metadata and retrieving the data from the remote data source.

6. The method of claim 1, wherein the updated copy of the set of set of metadata includes one or more rules for layout, one or more rules for visibility, one or more rules for Look & Feel, requirement, type, and navigation flow.

7. A system for providing a distributed metadata user interface, comprising:

a plurality of heterogeneous computing devices wherein each computing device further comprises a processor and a display and wherein the processor executes a client to dynamically render a user interface on the display;

a centralized server comprising a metadata database that is capable of being connected to each computing device to provide a copy of a set of metadata to each computing device and a security module that implements security methods to control access to the metadata and is interfaced with a master interface object that provides logic required for retrieving and writing information to the centralized information to the database; and for each of the heterogeneous computing devices executing a respective heterogeneous native clients simultaneously performing the steps of:

create a custom interface object from the master interface object, wherein the custom interface object customizes access and presentation of a user interface based on security privileges of the respective heterogeneous native client and each heterogeneous native client has different privileges;

verify security privileges of the client by the custom interface object and determine an accessible set of metadata accessible to the respective native client from the centralized server through a database abstraction layer that is in communication with the custom interface object, based on the security privileges of the respective native client;

retrieve, by the centralized server, the accessible set of metadata for the respective native client from the database;

determine, by the centralized server, if links to optional data sources is in the accessible set of metadata by performing the steps of:

parse the accessible set of metadata to identify field entries to optional data sources defined in the metadata; and iteratively processing each field entry by retrieving the data for update the accessible set of metadata;

generate a plurality of user interface elements, by the custom interface object for the client based on the updated accessible set of metadata;

generate an action user interface element for the client based on the updated accessible set of metadata, the action user interface element corresponding to an available action defined in the updated accessible set of metadata; and render the user interface for the client using the plurality of user interface elements and the action user interface element, wherein the user interface for the client is dynamically rendered based on the updated accessible set of metadata.

8. The system of claim 7, wherein the client is a software application that has a plurality of lines of computer code.

9. The system of claim 7, wherein the set of metadata includes one or more rules for layout, one or more rules for visibility, one or more rules for Look & Feel, requirement, type, and navigation flow.

* * * * *